Patented Aug. 25, 1931

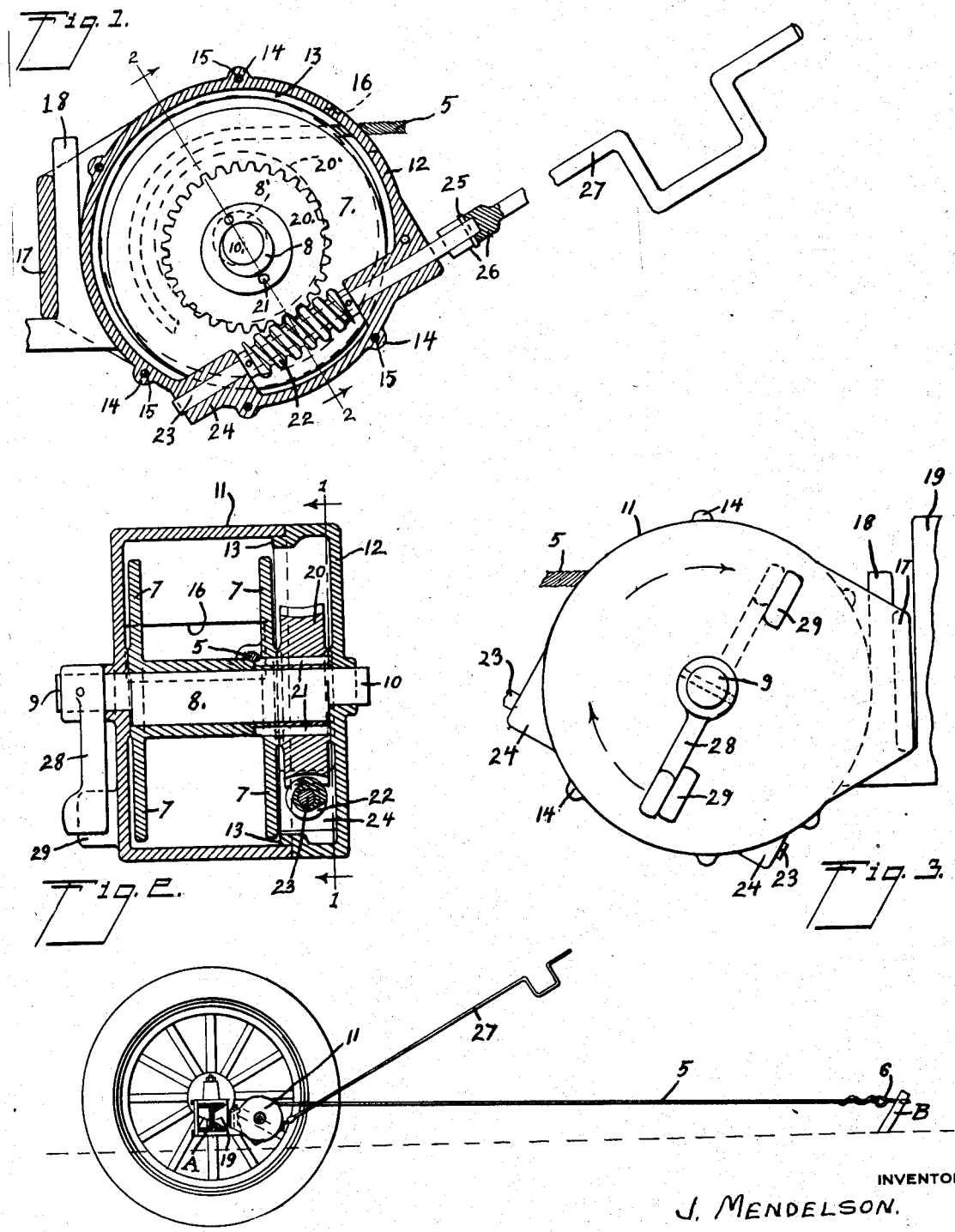

1,820,314

UNITED STATES PATENT OFFICE

JACOB MENDELSON, OF COUNCIL BLUFFS, IOWA

TOWING MEANS FOR MOTOR VEHICLES AND THE LIKE

Application filed August 12, 1929. Serial No. 385,244.

My invention relates to devices for use with motor vehicles and the like, for towing the same when disabled, and for extricating them when mired or when they are so situated or disabled as to be unable to move by their own power. It is the object of my invention to provide a light, simple and inexpensive mechanism which may be detachably connected with an axle or other portion of the vehicle frame, said mechanism having a cable or similar flexible member of suitable length for extension to another vehicle, or to a tree, post or other fixed object, and having means for winding the cable to produce a tension thereon sufficient to pull the mired or disabled vehicle to a free position. Further objects of my invention are to provide a suitable housing for the drum or spool and the cable or tension member which is wound thereon; to provide manually operable means for actuating the drum to place the cable under tension, said actuating means also serving to maintain the desired tension upon the cable by preventing rotation of the drum except under manual control; to provide means for disconnecting the drum from the actuating and retaining means, whereby to free the drum and allow the same to be rotated by tension upon the cable; and to provide means for detachably connecting the housing of the towing device with the frame of the vehicle.

In the accompanying drawings Fig. 1 is a vertical sectional view of a device embodying my invention, the section being on the plane of the line 1—1 of Fig. 2, Fig. 2 is a transverse section of the device, on the diagonal plane of the line 2—2 of Fig. 1, Fig. 3 is a side view of the device, and Fig. 4 is a diagrammatic side view, illustrating the use of the device for extricating a mired vehicle.

In carrying out my invention according to the illustrated embodiment thereof, I provide a flexible tension member or cable 5 which may be provided at one end with a hook 6, or other attaching device, as shown in Fig. 4. The other end of the cable is fixedly connected with a drum or spool 7 which is mounted revolubly upon a shaft 8. Said shaft is eccentric to its reduced end-portions 9 and 10 which fit revolubly in bearings formed centrally of the end portions of a cylindrical housing. The housing comprises a main portion or body 11 having an integral closed end, and provided at the opposite end with a removable cover portion 12. Preferably the cover 12 has an annular flange 13 extending into the open end of the body to center the cover therewith, and the sides of the body and cover are provided with registering lugs 14 through which are extended the screws 15 by which the cover is secured in place. At the front side of the body 11 is a slot 16 through which the cable 5 enters the housing, and at the rear side of the housing is an integral loop-member 17 which forms a vertical opening or socket for receiving the tongue 18 of the attaching-bracket 19. The latter is adapted to be fixedly secured to the axle A of a vehicle, as shown in Fig. 4, and the housing is mounted removably upon the bracket by inserting the tongue 18 into the socket formed by the loop-member 17.

At one end of the spool or drum 7, between the same and the end of the cover 12, and fitting rotatably about the shaft 8, is a worm-wheel 20 which is fixedly secured to the drum by means of pins or dowels 21. A worm 22, adapted to mesh operatively with said worm-wheel, is carried upon a shaft 23 which is mounted revolubly in bearings 24 formed integrally with the cover 12. The worm-shaft is upwardly inclined from the lower portion of the housing, the upper end of the shaft projecting from the bearing, as shown, and having a transverse clutch-pin 25 adapted for detachable connection with a slotted socket 26 at the end of a crank-rod 27.

The proportions and arrangement of eccentric shaft-body 8 and its end portions 9 and 10 are such that said shaft-body and the drum and worm-wheel carried thereon are held in eccentric relation to the housing, and so that by rotation of the shaft about the axis of the portions 9 and 10 the worm-wheel may be moved into and out of mesh with the worm. Thus, by turning the shaft approximately one-half a revolution, so that the eccentric body-portion is moved from the position shown in Fig. 1 to the position 8' indicated by dotted lines in said figure, the worm-wheel will be moved from the indicated position of operative engagement with the worm, to the disengaged position indicated by the dotted circle 20'. The position of the eccentric shaft-body 8 is controlled by means of an arm 28 which is secured upon the end-portion 9 projecting through the bearing at the closed end of the housing-member 11. Lugs 29 are formed integrally with said end of the housing-member, as shown in Figs. 2 and 3, said lugs being positioned to form stops for the arm 28, adapted to limit rotation thereof to substantially a half-revolution.

In the use of the described mechanism the bracket 19 is secured to the axle A of the vehicle, as shown in Fig. 4, and may remain permanently mounted thereon, the bracket being of such size and being so located as to be inconspicuous and not to interfere with the normal use of the vehicle. The housing, containing the drum and all of the cable except the free end and hook 6, and the crank-rod 27, may be carried normally in the tool-box or other convenient portion of the vehicle, and when required for use the housing is engaged with the tongue 18 of the bracket, whereby to be held in fixed relation to the vehicle frame.

For unwinding the cable from the drum the arm 28 is swung to position for disengaging the worm-wheel from the worm, whereby the drum is allowed to rotate freely upon the shaft, and the free end of the cable extending through the slot 16 may be pulled out to the desired length for connection with an object from which traction may be exerted upon the vehicle. After the desired length of the cable has been unwound from the drum, the end of the cable is attached to a suitable object, such as the stake B indicated in Fig. 4, and the arm 28 is moved to position for re-engaging the worm-wheel with the worm. The crank-rod 27 is then connected with the projecting upper end of the worm-shaft, and the latter rotated by turning the crank, whereby the worm is driven to actuate the worm-wheel and drum. By rotating the drum to wind the cable thereon the cable is placed under tension, and causes the required traction upon the vehicle to move the same from its mired position. The great mechanical advantage, resulting from the use of the worm and worm-wheel for turning the drum, enables the user to operate the device easily, and the worm also serves to prevent reverse motion of the drum, or unwinding of the cable by the tension thereon, except when rotation of the crank-rod is intentionally reversed for slackening of the cable. By the arrangement of the worm-shaft in inclined position, and the use of a crank-rod of suitable length, the user may conveniently operate the same from a standing position, without bending, stooping, or reaching in alongside the vehicle wheels, or beneath the fenders or frame.

For simple towing of a disabled vehicle, a suitable length of the cable is unwound from the drum to allow connection to be made with the towing vehicle, and the drum is then secured against further rotation by engaging the worm-wheel with the worm.

Now, having described my invention, what I claim and desire to secure by Letters Patent is:

In a towing device for motor vehicles, a substantially cylindrical housing having at one side of the peripheral portion thereof an integral loop-member forming a socket, a bracket-member fixedly secured upon the vehicle-frame and having a tongue adapted to enter said socket to detachably retain the housing in fixed relation to the vehicle-frame, a shaft mounted revolubly in the ends of the housing and having an eccentric body inclosed within the housing, a drum mounted revolubly on said eccentric body of said shaft, a worm-wheel affixed to said drum, a worm mounted revolubly in said housing upon a fixed axis and adapted for engagement with said worm-wheel to actuate the same and to inhibit free rotation thereof, said worm-wheel being engaged with said worm and disengaged therefrom by rotation of said shaft to vary the position of the eccentric body thereof, means for rotating said shaft to effect engagement and disengagement of the worm-wheel and worm, and actuating means connected with said worm and extending from the housing to enable driving of the worm from a position remote from the housing.

JACOB MENDELSON.